United States Patent
Baba

(10) Patent No.: US 8,699,048 B2
(45) Date of Patent: Apr. 15, 2014

(54) IMAGE PROCESSING APPARATUS WITH IMPROVED IMAGE PROCESSING EFFICIENCY

(71) Applicant: KYOCERA Document Solutions Inc., Osaka (JP)

(72) Inventor: Masaki Baba, Osaka (JP)

(73) Assignee: KYOCERA Document Solutions Inc., Chuo-ku, Osaka (JP)

( * ) Notice: Subject to any disclaimer, the term of this patent is extended or adjusted under 35 U.S.C. 154(b) by 0 days.

(21) Appl. No.: 13/731,763

(22) Filed: Dec. 31, 2012

(65) Prior Publication Data

US 2013/0120782 A1  May 16, 2013

Related U.S. Application Data

(62) Division of application No. 12/266,274, filed on Nov. 6, 2008, now Pat. No. 8,368,975.

(30) Foreign Application Priority Data

Nov. 7, 2007 (JP) ................................. 2007-289800

(51) Int. Cl.
*H04N 1/04* (2006.01)
*G06F 3/12* (2006.01)

(52) U.S. Cl.
USPC .......... 358/1.13; 358/408; 358/474; 358/486; 358/496; 358/468; 358/404; 358/444

(58) Field of Classification Search
USPC ......... 358/408, 486, 474, 496, 498, 404, 444, 358/468, 1.13, 1.16, 1.17; 382/312, 318, 382/319; 399/374, 367; 355/23, 24
See application file for complete search history.

(56) References Cited

U.S. PATENT DOCUMENTS

| | | | |
|---|---|---|---|
| 4,908,719 A | 3/1990 | Nonoyama | |
| 5,412,485 A | 5/1995 | Kashiwagi | |
| 5,485,287 A | 1/1996 | Nakamura et al. | |
| 5,619,343 A | 4/1997 | Amemiya | |
| 6,075,622 A | 6/2000 | Hadgis et al. | |
| 6,678,076 B1 | 1/2004 | Hasegawa et al. | |
| 7,626,735 B2* | 12/2009 | Mizuhashi et al. | 358/474 |
| 7,742,191 B2* | 6/2010 | Eda | 358/1.9 |
| 7,920,296 B2* | 4/2011 | Beato et al. | 358/3.28 |
| 8,314,974 B2* | 11/2012 | Kweon | 358/474 |
| 2002/0041407 A1 | 4/2002 | Takahashi et al. | |
| 2006/0291013 A1 | 12/2006 | Shimizu | |
| 2010/0123282 A1 | 5/2010 | Miyakoshi | |
| 2010/0302581 A1* | 12/2010 | Yamazaki | 358/1.15 |
| 2011/0075227 A1* | 3/2011 | Watanabe | 358/474 |
| 2011/0188091 A1* | 8/2011 | Watanabe et al. | 358/448 |
| 2011/0194161 A1 | 8/2011 | Nakamura | |
| 2012/0008162 A1* | 1/2012 | Takishima | 358/1.15 |
| 2012/0228823 A1 | 9/2012 | Miyakoshi | |

FOREIGN PATENT DOCUMENTS

JP  2002-0232671 A  8/2002

* cited by examiner

*Primary Examiner* — Cheukfan Lee
(74) *Attorney, Agent, or Firm* — Ditthavong Mori & Steiner, P.C.

(57) ABSTRACT

A multifunctional printer comprises a CCD for reading an image on one side of a document, a CIS for reading an image on the other side of the document, an image processing unit for processing the image of the side read by the CCD or the CIS, and a determining unit (S12) for determining which of the images of the sides read by the CCD and the CIS is to be processed first by the image processing unit.

15 Claims, 3 Drawing Sheets

IMAGE PROCESSING APPARATUS WITH IMPROVED IMAGE PROCESSING EFFICIENCY

PRIORITY CLAIM AND CROSS-REFERENCE TO RELATED APPLICATIONS

The present application is a division of prior U.S. application Ser. No. 12/266,274 filed Nov. 6, 2008, now U.S. Pat. No. 8,368,975, which claims priority to Japanese Patent Application No. 2007-289800filed Nov. 7, 2007, the entireties of which are incorporated herein.

BACKGROUND OF THE INVENTION

1. Field of the Invention

The present invention generally relates to an image processing apparatus. More particularly, the present invention relates to an image processing apparatus capable of simultaneously reading both sides of a document.

2. Description of the Background Art

There are image processing apparatuses which have two reading portions for respectively reading both sides of a document (that is, front and back sides of a document) so that images on both sides of the document can be simultaneously read by one-time feeding without reversing the document. For example, a CCD (Charge Coupled Device) for reading an image on a front side of a document and a CIS (Contact Image Sensor) for reading an image on a back side of a document are provided on a transport path of a document feeder, and the CCD and the CIS read images on both sides of a document. Since there is no need to reverse a document, this structure reduces the time required to read images on both sides of a document, thereby implementing reduction in overall image processing speed.

A technology regarding an image processing apparatus capable of reading images on both sides of a document is disclosed in Japanese Patent Publication No. 2002-232671 of unexamined applications. According to this publication, image data read from both sides of the document is transmitted to the outside in an optimal order according to the transmission rate of the image data to the outside.

According to this publication, the data can be transmitted to the outside in an optimal order according to the transmission rate. Even though the order of transmitting the data is optimal according to the transmission rate to the outside, however, the order may not be optimal in the overall system of the image processing apparatus. Therefore, the image processing efficiency may not be appropriate.

SUMMARY OF THE INVENTION

It is an object of the present invention to provide an image processing apparatus with improved image processing efficiency.

It is another object of the present invention to provide an image processing method with improved image processing efficiency.

An image processing apparatus according to one aspect of the present invention is capable of reading images on both sides of a document while transporting the document. The image processing apparatus comprises: a first image reading unit for reading an image on one side of the document; a second image reading unit for reading an image on the other side of the document; an image processing unit for processing the images of the side read by the first and second image reading unit; and a determining unit for determining which of the images of the sides read by the first and second image reading units is to be processed first by the image processing unit.

According to the present invention, of the images on both sides of the document read by the first and second image reading units, the image of the side to be processed first by the image processing unit is determined. This can improve the image processing efficiency as the overall system of the image processing apparatus. For example, in the case where a reading unit for reading the front side of the document and a reading unit for reading the back side of the document are provided at different positions in the image processing apparatus, the image on the side that was read first can be processed first. The image processing efficiency can thus be improved.

Preferably, the determining unit determines that the image of the side that was read first by the first or second image reading unit is to be processed first.

The determining unit may determine that the image of the side that requires a shorter image processing time of the image processing unit is to be processed first.

The image processing apparatus may further include a selecting unit for allowing selection about which of the images of the sides read by the first and second image reading units is to be processed first, and the determining unit may determine that the image of the side selected by the selecting unit is to be processed first.

More preferably, the image processing unit performs image processing on a page-by-page basis.

An image processing method according to another aspect of the present invention is an image processing method for reading images on both sides of a document while transporting the document, and processing the read images. The image processing method includes the steps of; reading an image on one side of the document; reading an image on the other side of the document; determining which of the images of the sides is to be processed first; and processing the image of the determined side first. Such an image processing method can improve the image processing efficiency.

Preferably, in the image processing method, it is determined that, of the read images on both sides of the document, the image of the side that was read first is to be processed first.

In the image processing method, it may be determined that, of the read images on both sides of the document, the image of the side that requires a shorter image processing time is to be processed first.

In the image processing method, it may be determined that, of the read images on both sides of the document, the image of the side selected to be processed first is to be processed first.

In a more preferred embodiment, in the image processing method, image processing is performed on a page-by-page basis.

More preferably, in the image processing method, an image on one side of a document is read by a CCD for reading an image on a document by emitting light to the document and receiving reflected light from the document.

In the image processing method, an image on the other side of a document may be read by a CIS for reading an image on a document by emitting light to the document from a built-in light source and receiving reflected light from the document.

In the image processing method, an image on one side of a document may be read by a CCD for reading an image on a document by emitting light to the document and receiving reflected light from the document, an image on the other side of the document may be read by a CIS for reading an image on a document by emitting light to the document from a built-in light source and receiving reflected light from the document, and it may determined that the image on the side read by the CIS is to be processed first.

In the image processing method, image processing may be performed on a line-by-line basis in a page.

DESCRIPTION OF THE PREFERRED EMBODIMENTS

Figure 1:
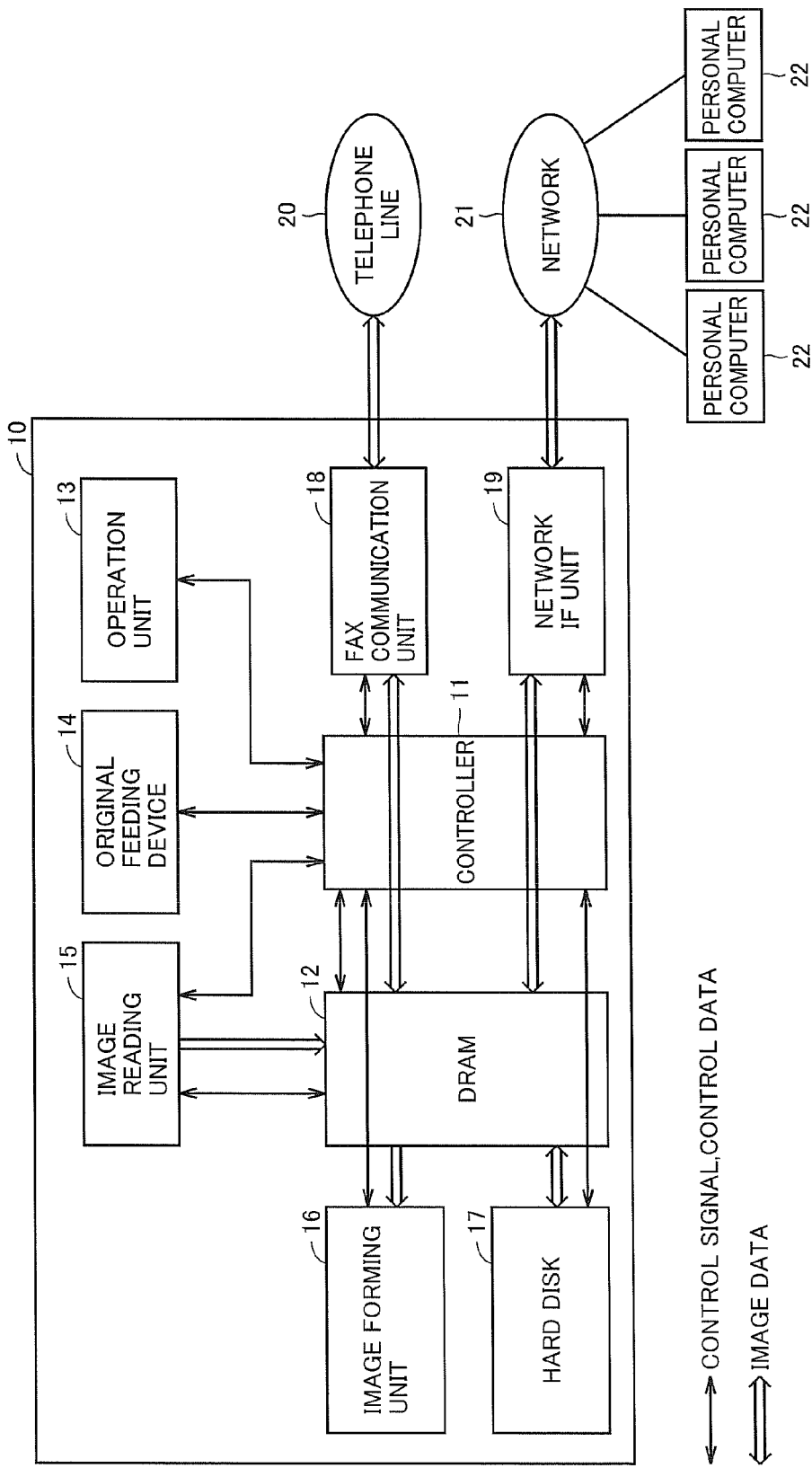
FIG. 1 is a block diagram showing the overall structure of a multifunctional printer according to an embodiment of the present invention.

Hereinafter, an embodiment of the present invention will be described with reference to the accompanying drawings. FIG. 1 is a block diagram showing a structure of a multifunctional printer 10. In this example, an image processing apparatus according to an embodiment of the present invention is applied to the multifunctional printer 10. Referring to FIG. 1, the multifunctional printer 10 comprises a controller 11, a DRAM (Dynamic Random Access Memory) 12, an operation unit 13, a original feeding device 14, an image reading unit 15, an image forming unit 16, a hard disk 17, a FAX communication unit 18, and a network IF (interface) unit 19. The controller 11 generally controls the multifunctional printer 10. The DRAM 12 performs write and read operations of data such as image data. The operation unit 13 includes a display screen for displaying information that the multifunctional printer 10 has, and serves as an interface between the multifunctional printer 10 and the user. The original feeding device 14 automatically transports a document to a predetermined document read position. The image reading unit 15 reads an image of the document transported by the original feeding device 14 at the predetermined read position. The image forming unit 16 forms an image based on the document or the like read by the image reading unit 15 and outputs the image onto paper or the like. The hard disk 17 stores image data or the like therein. The FAX communication unit 18 is connected to a telephone line 20. The network IF unit 19 is connected to a network 21. The original feeding device 10 further includes an image processing unit for processing an image that is read by the image reading unit 15.

The controller 11 compresses and encodes document data received from the image reading unit 15 and writes the resultant data to the DRAM 12. The controller 11 also reads the data from the DRAM 12, decompresses and encodes the read data, and outputs the resultant data from the image forming unit 16.

The multifunctional printer 10 operates as a copying machine by forming an image in the image forming unit 16 through the DRAM 12 by using a document read by the image reading unit 15. The multifunctional printer 10 also operates as a printer by forming an image in the image forming unit 16 through the DRAM 12 by using image data received from a personal computer (PC) 22 connected to the network 21 through the network IF unit 19. The multifunctional printer 10 also operates as a facsimile machine by forming an image in the image forming unit 16 through the DRAM 12 by using image data received from the telephone line 20 through the FAX communication unit 18, or by transmitting image data of a document read by the image reading unit 15 to the telephone line 20 through the FAX communication unit 18.

Note that, in FIG. 1, thick arrows indicate a flow of image data, and thin arrows indicate a flow of a control signal or control data.

Figure 2:
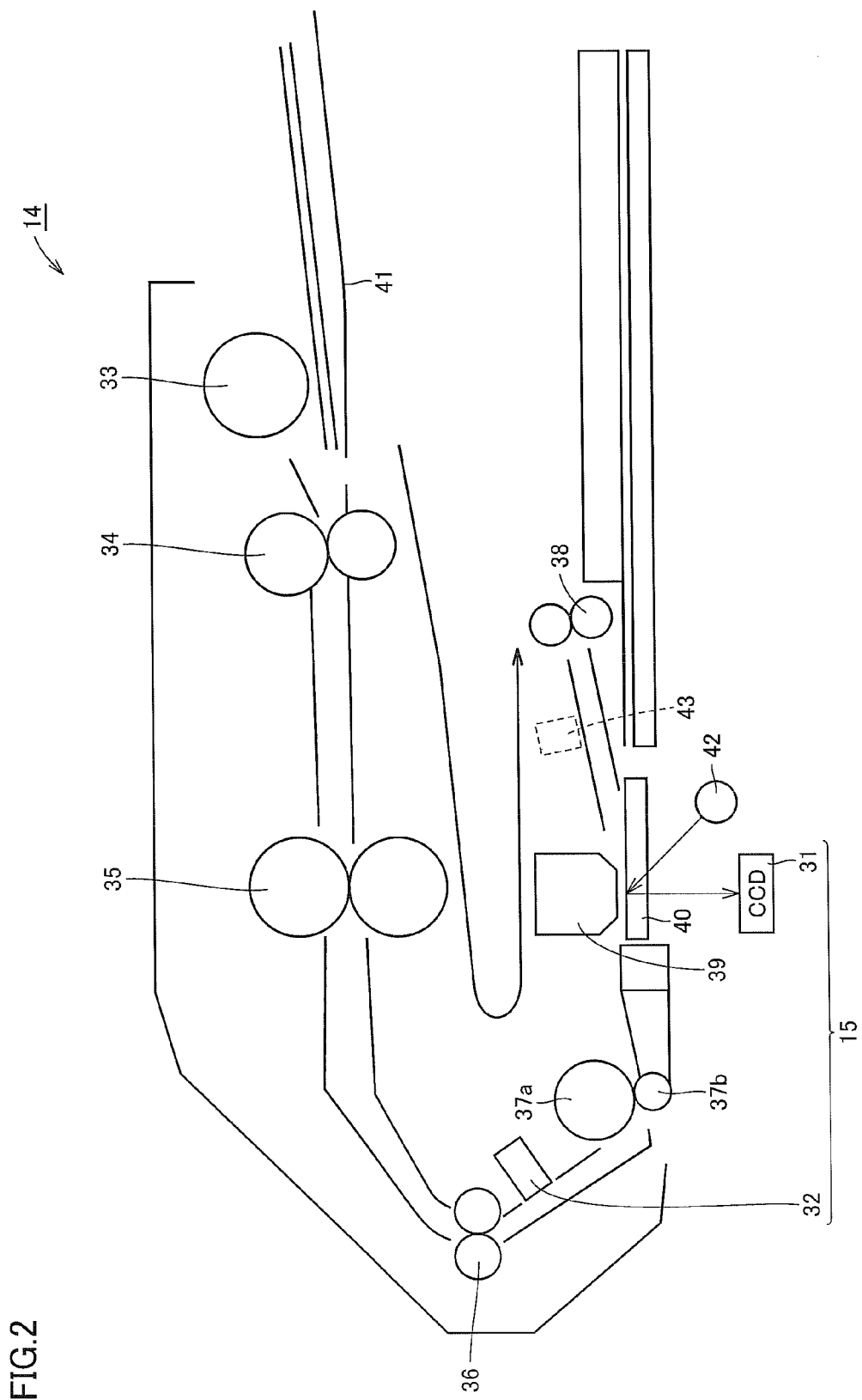
FIG. 2 is a schematic diagram showing an original feeding device and an image reading unit which are included in the multifunctional printer.

A specific structure of the original feeding device 14 and the image reading unit 15 will now be described. FIG. 2 is a schematic diagram showing a part of the original feeding device 14 and the image reading unit 15. Referring to FIGS. 1 and 2, the image reading unit 15 includes a CCD 31 as a first reading unit for reading image data of one side (front side) of a document, and a CIS 32 as a second reading unit for reading image data of the other side (back side) of the document. The original feeding device 14 includes a transporting member for transporting a document. A document is transported by the transporting member in the direction shown by arrow in FIG. 2. Note that the side to which a document is transported is herein referred to as a "downstream" side.

The transporting member includes a pickup roller 33, a separating roller 34, transporting rollers 35, 36, 37a, 37b, a discharging roller 38, and a guide member 39. The pickup roller 33 sequentially feeds documents that are placed and set on a tray 41. The separating roller 34 separates the documents one by one. The transporting rollers 35, 36, 37a, 37b transport a document to the CIS 32 and the CCD 31. The discharging roller 38 discharges a read document. The guide member 39 guides a document transported by the feeding rollers 37a, 37b to the CCD 31.

The CIS 32 includes a built-in light source (not shown). The CIS 32 reads image data of the back side of a document by emitting light to the back side of the document from the built-in light source and receiving reflected light from the document. The CCD 31 reads image data of the front side of a document by emitting light to the front side of the document through a read glass 40 from a light source 42 and receiving reflected light from the document.

The CIS 32 is provided between the transporting roller 36 and the transporting rollers 37a, 37b. The CCD 31 is provided downstream of the transporting rollers 37a, 37b and under the read glass 40. In other words, the CIS 32 is provided upstream of the CCD 31. Since the CCD 31 and the CIS 32 are thus provided at different positions, problems such as see-through of an image of a document caused by reflected light are prevented, and an image on each side of a document is read appropriately.

Figure 3:
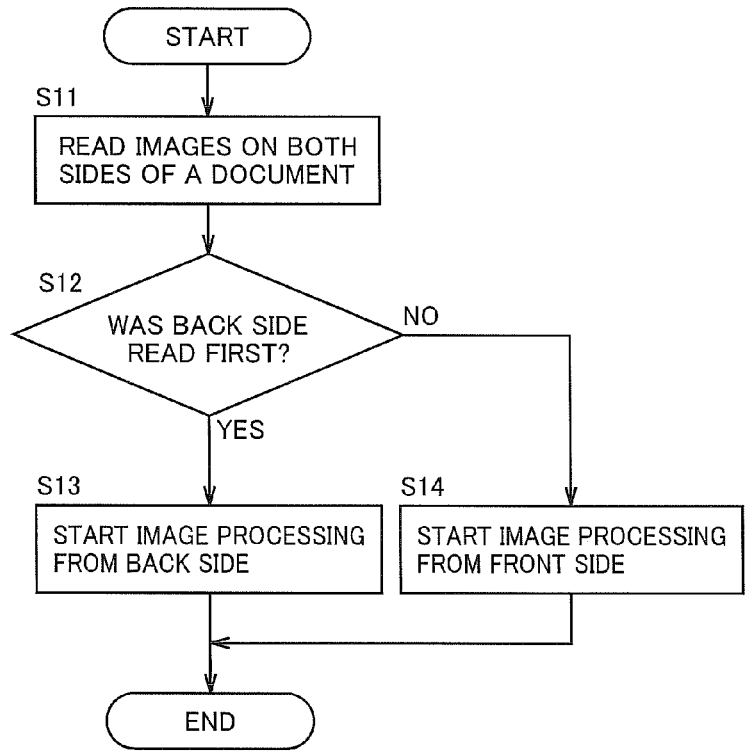
FIG. 3 is a flowchart illustrating an operation of a controller in image processing.

An example in which images on both sides of a document are read and formed by the multifunctional printer 10 will now be described. FIG. 3 is a flowchart illustrating an operation of the controller in this example. Referring to FIGS. 1 through 3, a document is first placed on the tray 41. In response to a command to copy images on both sides of a document, the controller 11 transports the document by the original feeding device 14 and starts reading images on both sides of the document by the CIS 32 and the CCD 31 (Step S11 in FIG. 3; hereinafter, the word "Step" will be omitted). More specifically, an image on the back side of the document is read by the CIS 32 and an image on the front side of the document is read by the CCD 31.

Next, the side of the document which was read first is determined (S12). In this case, since the CIS 32 is located upstream of the CCD 31, it is determined that the back side read by the CIS 32 was read first (YES in S12). In this case, the controller 11 operates as a determining unit. Processing of the image of the back side is thus started first (S13). In this case, the image processing is performed on a page-by-page basis. Processing of the image of the front side is performed after the image processing of the back side is completed.

In this way, the controller 11 determines that the image of the side that was read first by the CCD 31 or the CIS 32 is to be processed first. In this case, since the image of the back side is first read by the CIS 32, image processing of the back side can be performed as soon as reading of the image of the back side is started. In the case where the image processing of the back side is completed during reading of the image of the front side by the CCD 31, image processing of the front side can be started even during reading of the front side. Therefore, for example, the time to make a first copy can be reduced, whereby the image processing efficiency can be improved.

Hereinafter, an example in which a CIS 43 is provided downstream of the CCD 31 as shown by dotted line in FIG. 2 will be described. In this case, it is determined that the front side read by the CCD 31 was read first (NO in S12). Image processing of the front side is thus started first. Image processing of the back side is performed after the image processing of the front side is completed. The image processing efficiency can thus be improved.

Note that, in the above embodiment, it is determined that an image of the side that was read first is to be processed first. However, the present invention is not limited to this. After images on both sides of a document are read, the image of the side that requires a shorter image processing time may be determined and image processing of the determined side may be performed first. For example, if an image is to be formed at different scale factors between the front side and back side of a document, a region to be read (a read region) is different between the front side and back side of the document. In the case where the processing time is proportional to the area of the read region, that is, in the case where the processing time decreases with decrease in the area of the read region, an image of the side having a smaller read region is processed first. This method can also improve the image processing efficiency. In this case, the present invention is also applicable to a multifunctional printer in which a CCD and a CIS are provided at the same position in a transport path, that is, a multifunctional printer in which a CIS is provided above a CCD.

Figure 4:
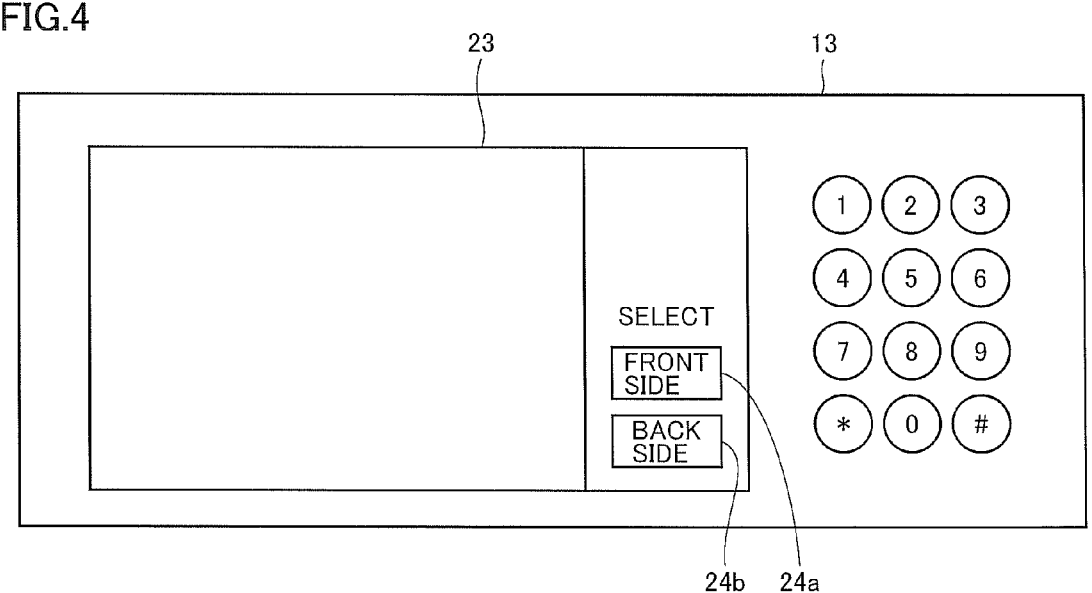
FIG. 4 is a diagram showing an example of an operation panel.

In the multifunctional printer, an operation panel for allowing selection of the side to be processed first may be displayed on a display screen included in the operation unit, and the determining unit may determine that the side selected by a user or the like through the operation panel is to be processed first. In this case, the operation unit operates as a selecting unit. FIG. 4 shows an example of the operation panel of this example. Referring to FIG. 4, an operation panel 23 is displayed on a display screen of the operation unit 13. The operation panel 23 included in the operation unit 13 includes a select button 24a for selecting a front side of a document as a side to be processed first, and a select button 24b for selecting a back side of a document as a side to be processed first. According to a user's request, the user selects a side of a document to be processed first by pressing the select button 24a or 24b before a document is read. It is thus determined that the selected side is to be processed first. In this way, for example, an image of the side that is requested to be printed first is processed first according to the user's request. The printing speed can thus be increased. In this case as well, the present invention is also applicable to a multifunctional printer in which a CCD and a CIS are provided at the same position in a transport path.

Note that, in the above embodiment, image processing is performed on a page-by-page basis. However, the present invention is not limited to this. For example, image processing may be performed on a line-by-line basis in a page.

An image processing method according to the present invention is an image processing method for reading images on both sides of a document while transporting the document, and processing the read images. The image processing method comprises the steps of: reading an image on one side of the document; reading an image on the other side of the document; determining the image of which side is to be processed first; and processing the image of the determined side first. This image processing method can improve the image processing efficiency.

Preferably, in the image processing method, it is determined that, of the read images on both sides of the document, the image of the side that was read first is to be processed first.

In the image processing method, it may be determined that, of the read images on both sides of the document, the image of the side that requires a shorter image processing time is to be processed first.

In the image processing method, it may be determined that, of the read images on both sides of the document, the image of the side selected to be processed first is to be processed first.

In a more preferred embodiment, image processing is performed on a page-by-page basis in the image processing method.

More preferably, in the image processing method, an image on one side of a document is read by a CCD for reading an image on a document by emitting light to the document and receiving reflected light from the document.

In the image processing method, an image on the other side of a document may be read by a CIS for reading an image on a document by emitting light to the document from a built-in light source and receiving reflected light from the document.

In the image processing method, an image on one side of a document may be read by a CCD for reading an image on a document by emitting light to the document and receiving reflected light from the document, an image on the other side of the document may be read by a CIS for reading an image on a document by emitting light to the document from a built-in light source and receiving reflected light from the document, and it may be determined that the image on the side read by the CIS is to be processed first.

In the image processing method, image processing may be performed on a line-by-line basis in a page.

Although an embodiment of the present invention has been described above with reference to the figures, the present invention is not limited to the above described and illustrated embodiment. Various modifications and variations can be made to the above described and illustrated embodiment within the same scope as, or an equivalent scope to, the present invention.

What is claimed is:

1. An image processing apparatus capable of reading images on both sides of a document while transporting said document, comprising:
   a first image reading unit for reading an image on one side of said document;
   a second image reading unit for reading an image on the other side of said document;
   an image processing unit for processing the image of the side read by said first and second image reading units; and
   a determining unit for determining which of the images of the sides read by the first and second image reading units is to be processed first by said image processing unit, wherein said determining unit determines that the image of the side that requires a shorter image processing time of said image processing unit is to be processed first.

2. The image processing apparatus according to claim 1, wherein said image processing unit performs image processing on a page-by-page basis.

3. The image processing apparatus according to claim 1, wherein:
said first image reading unit includes a CCD;
said first image reading unit irradiates light to the front side of said document, and
said CCD reads an image on the front side of said document by receiving reflected light from said document.

4. The image processing apparatus according to claim 1, wherein said second image reading unit includes a CIS for reading an image on a back side of a document by emitting light to the back side of said document from a built-in light source and receiving reflected light from said document.

5. The image processing apparatus according to claim 1, wherein said image processing unit performs image processing on a line-by-line basis in a page.

6. An image processing apparatus capable of reading images on both sides of a document while transporting said document, comprising:
a first image reading unit for reading an image on one side of said document;
a second image reading unit for reading an image on the other side of said document;
an image processing unit for processing the image of the side read by said first and second image reading units;
a determining unit for determining which of the images of the sides read by the first and second image reading units is to be processed first by said image processing unit; and
a selecting unit for allowing selection about which of the images of the sides read by said first and second image reading units is to be processed first, and said determining unit determines that the image of the side selected by said selecting unit is to be processed first.

7. The image processing apparatus according to claim 6, wherein said image processing unit performs image processing on a page-by-page basis.

8. The image processing apparatus according to claim 6, wherein:
said first image reading unit includes a CCD;
said first image reading unit irradiates light to the front side of said document, and
said CCD reads an image on the front side of said document by receiving reflected light from said document.

9. The image processing apparatus according to claim 6, wherein said second image reading unit includes a CIS for reading an image on a back side of a document by emitting light to the back side of said document from a built-in light source and receiving reflected light from said document.

10. The image processing apparatus according to claim 6, wherein said image processing unit performs image processing on a line-by-line basis in a page.

11. An image processing method for reading images on both sides of a document while transporting said document, and processing the read images, comprising the steps of:
reading an image on one side of said document;
reading an image on the other side of said document;
determining which of the images of the sides is to be processed first; and
processing the image of the determined side first,
wherein it is determined that, of the read images on both sides of said document, the image of the side that requires a shorter image processing time is to be processed first.

12. The image processing method according to claim 11, wherein image processing is performed on a page-by-page basis.

13. The image processing method according to claim 11, wherein light is irradiated to said document, and wherein an image on one side of said document is read by a CCD for reading an image on a document by receiving reflected light from the document.

14. The image processing method according to claim 11, wherein an image on the other side of a document is read by a CIS for reading an image on a document by emitting light to the document from a built-in light source and receiving reflected light from the document.

15. The image processing method according to claim 11, wherein image processing is performed on a line-by-line basis in a page.

* * * * *